United States Patent
Goetz

(10) Patent No.: US 11,200,917 B2
(45) Date of Patent: Dec. 14, 2021

(54) SYSTEM AND METHOD FOR AUTOMATICALLY CREATING A VIDEO OF A JOURNEY

(71) Applicant: Bayerische Motoren Werke Aktiengesellschaft, Munich (DE)

(72) Inventor: Philipp Goetz, Petershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/762,036

(22) PCT Filed: Feb. 11, 2019

(86) PCT No.: PCT/EP2019/053314
§ 371 (c)(1),
(2) Date: May 6, 2020

(87) PCT Pub. No.: WO2019/162128
PCT Pub. Date: Aug. 29, 2019

(65) Prior Publication Data
US 2020/0273492 A1  Aug. 27, 2020

(30) Foreign Application Priority Data

Feb. 20, 2018  (DE) .................... 10 2018 202 514.2

(51) Int. Cl.
*H04N 9/80* (2006.01)
*G11B 27/031* (2006.01)
(Continued)

(52) U.S. Cl.
CPC ............ *G11B 27/031* (2013.01); *G11B 27/11* (2013.01); *G11B 27/34* (2013.01); *H04N 5/77* (2013.01);
(Continued)

(58) Field of Classification Search
USPC .................................................. 386/248, 278
See application file for complete search history.

(56) References Cited

U.S. PATENT DOCUMENTS

| | | | | |
|---|---|---|---|---|
| 8,930,231 B2 * | 1/2015 | Bowne | ................... | B60W 40/09 705/4 |
| 8,935,013 B2 * | 1/2015 | Wanami | ................... | B60R 21/01 701/1 |

(Continued)

FOREIGN PATENT DOCUMENTS

| DE | 10 2009 020 997 A1 | 12/2009 |
|---|---|---|
| DE | 10 2008 062 168 A1 | 6/2010 |

(Continued)

OTHER PUBLICATIONS

International Search Report (PCT/ISA/210) issued in PCT Application No. PCT/EP2019/053314 dated May 9, 2019 with English translation (four (4) pages).

(Continued)

*Primary Examiner* — Nigar Chowdhury
(74) *Attorney, Agent, or Firm* — Crowell & Moring LLP

(57) ABSTRACT

A system and method for automatically creating a video of a journey includes at least one computer unit and at least one vehicle. The vehicle has at least one sensor which is configured to continuously detect technical driving parameters of the vehicle. The vehicle also has at least one video camera which is configured to continuously record video sequences of a predefinable length. The computer unit is configured to process each of the video sequences with respect to the detected technical driving parameters and also to tag each of the processed video sequences with reference to predefinable criteria. The computer unit is configured to automatically create a video including a predefinable number of suitably tagged video sequences.

19 Claims, 3 Drawing Sheets

(51) Int. Cl.
  *G11B 27/11* (2006.01)
  *G11B 27/34* (2006.01)
  *H04N 5/77* (2006.01)
  *H04N 21/2543* (2011.01)
  *H04N 21/258* (2011.01)
  *G11B 27/00* (2006.01)
  *H04N 5/93* (2006.01)

(52) U.S. Cl.
  CPC . *H04N 21/25435* (2013.01); *H04N 21/25808* (2013.01)

(56) References Cited

U.S. PATENT DOCUMENTS

| | | | | |
|---|---|---|---|---|
| 9,127,946 | B1* | 9/2015 | Menon | G01C 21/12 |
| 9,286,938 | B1* | 3/2016 | Tseytlin | G11B 27/34 |
| 9,405,186 | B1* | 8/2016 | Abdo | G06F 30/398 |
| 9,571,819 | B1* | 2/2017 | Barron | H04N 13/239 |
| 9,666,067 | B1* | 5/2017 | Nagpal | G08G 1/20 |
| 9,674,490 | B2* | 6/2017 | Koravadi | B60R 11/04 |
| 9,975,483 | B1* | 5/2018 | Ramaswamy | B60W 40/08 |
| 10,032,318 | B1* | 7/2018 | Ferguson | G07C 5/008 |
| 10,262,478 | B2* | 4/2019 | Kataoka | B62D 15/0265 |
| 10,440,431 | B1* | 10/2019 | Bulusu | H04N 21/4667 |
| 10,474,913 | B2* | 11/2019 | Shinoda | H04N 5/91 |
| 2009/0025039 | A1* | 1/2009 | Bronstein | G06F 16/739 |
| | | | | 725/60 |
| 2009/0132510 | A1* | 5/2009 | Dimitrova | G11B 27/102 |
| 2010/0153183 | A1* | 6/2010 | Ulwick | G06Q 30/02 |
| | | | | 705/7.12 |
| 2010/0185628 | A1* | 7/2010 | Weda | G11B 27/10 |
| | | | | 707/752 |
| 2010/0312906 | A1* | 12/2010 | Van Gassel | G06Q 30/02 |
| | | | | 709/231 |
| 2011/0217019 | A1* | 9/2011 | Kamezawa | H04N 5/907 |
| | | | | 386/224 |
| 2011/0304447 | A1* | 12/2011 | Marumoto | G07C 5/085 |
| | | | | 340/438 |
| 2012/0173655 | A1* | 7/2012 | McEntee | G06F 16/1834 |
| | | | | 709/216 |
| 2012/0209841 | A1* | 8/2012 | Saretto | G06F 16/784 |
| | | | | 707/736 |
| 2014/0376792 | A1* | 12/2014 | Matsuzaki | A61B 1/00009 |
| | | | | 382/128 |
| 2016/0029106 | A1* | 1/2016 | Chen | G06F 16/738 |
| | | | | 386/282 |
| 2016/0104049 | A1* | 4/2016 | Stenneth | G06K 9/3258 |
| | | | | 382/155 |
| 2016/0180413 | A1* | 6/2016 | Tang | G06Q 30/0282 |
| | | | | 705/347 |
| 2016/0202147 | A1* | 7/2016 | Svantesson | B60C 19/00 |
| | | | | 702/189 |
| 2016/0225410 | A1* | 8/2016 | Lee | H04N 21/23424 |
| 2016/0323507 | A1* | 11/2016 | Chong | G06T 11/00 |
| 2016/0371553 | A1* | 12/2016 | Farnham, IV | G07C 5/008 |
| 2017/0057542 | A1* | 3/2017 | Kim | G05D 1/0088 |
| 2017/0133054 | A1* | 5/2017 | Song | G11B 27/28 |
| 2017/0169853 | A1* | 6/2017 | Hu | H04N 21/235 |
| 2017/0249856 | A1* | 8/2017 | Fischer | G09B 19/16 |
| 2017/0251163 | A1* | 8/2017 | Ochiai | G06K 9/00832 |
| 2018/0050698 | A1* | 2/2018 | Polisson | B60W 60/00 |
| 2018/0076243 | A1* | 3/2018 | Tashiro | H01L 27/146 |
| 2018/0102051 | A1* | 4/2018 | Suthar | G06Q 50/26 |
| 2018/0237019 | A1* | 8/2018 | Goto | B60W 30/12 |
| 2018/0259969 | A1* | 9/2018 | Frazzoli | B60W 10/10 |
| 2018/0268695 | A1* | 9/2018 | Agnew | B60K 28/066 |
| 2018/0295262 | A1* | 10/2018 | Dellock | H04N 5/247 |
| 2019/0018418 | A1* | 1/2019 | Tseng | H04W 4/02 |
| 2019/0075374 | A1* | 3/2019 | Panchaksharaiah | H04N 21/432 |

FOREIGN PATENT DOCUMENTS

| | | |
|---|---|---|
| DE | 10 2012 003 981 A1 | 8/2013 |
| DE | 10 2014 112 574 A1 | 3/2016 |

OTHER PUBLICATIONS

German-language Written Opinion (PCT/ISA/237) issued in PCT Application No. PCT/EP2019/053314 dated May 9, 2019 (six (6) pages).

German-language Office Action issued in German Application No. 10 2018 202 514.2 dated Feb. 12, 2019 (five (5) pages).

\* cited by examiner

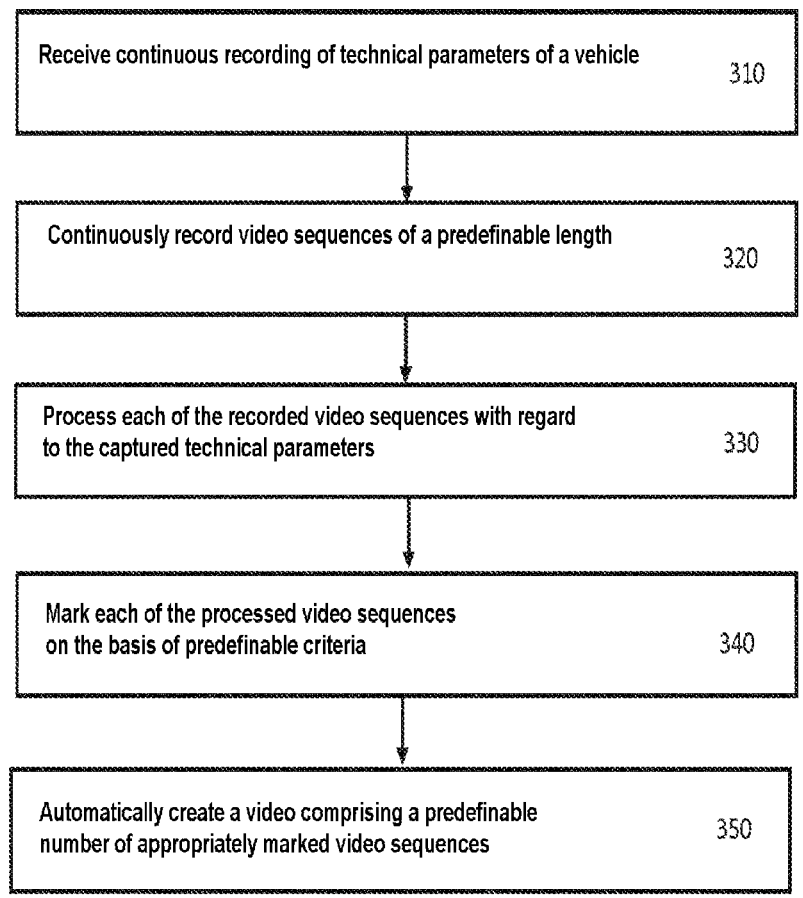

SYSTEM AND METHOD FOR AUTOMATICALLY CREATING A VIDEO OF A JOURNEY

BACKGROUND AND SUMMARY OF THE INVENTION

The present invention relates to a system and to a method for automatically creating a meaningful video of a vehicle journey.

Modern vehicles comprise a multiplicity of sensors that for example play a role in the provision of driver assistance systems. Driver assistance systems are systems that intervene partly autonomously or autonomously in the drive, the control and/or signaling devices of the vehicle. The sensors may for example comprise video cameras, lidar sensors, radar sensors, etc. The measured variables captured by the sensors are processed and exploited for the use of the driver assistance systems.

In some driving situations, such as for example in the case of journeys on racetracks and/or in driver training, a driver of a vehicle may be interested in meaningful recordings of his own journey.

The object of the invention is to use sensors present in the vehicle to automatically create a meaningful video of a journey.

This object is achieved according to the invention by the features of the independent claims. Preferred embodiments are the subject matter of the dependent claims.

The abovementioned object is achieved by way of a system for automatically creating a video of a journey, comprising:
 a computer unit;
 a vehicle, wherein the vehicle comprises:
 at least one sensor that is configured so as to continuously capture technical driving parameters of the vehicle;
 at least one video camera that is configured so as to continuously record video sequences of a predefinable length;
 wherein the computer unit is configured so as:
 to process each of the video sequences with regard to the captured technical driving parameters;
 to mark each of the processed video sequences on the basis of predefinable criteria, and
 to automatically create a video comprising a predefinable number of appropriately marked video sequences.

The term vehicle comprises automobiles, trucks, buses, RVs, motorcycles, etc. that are used to transport people, goods, etc. The term in particular comprises motor vehicles for passenger transport.

The system comprises at least one computer unit. The system comprises at least one vehicle. Each vehicle comprises at least one sensor. The sensor is configured so as to continuously capture technical driving parameters of the vehicle. Continuously in this case comprises for example at regular time intervals and/or upon predefined events. Each vehicle comprises at least one video camera that is configured so as to continuously record video sequences of a predefinable length.

The video camera, at least one sensor and/or the computer unit may be integrated in a fixed manner in the vehicle. The at least one video camera may be installed in the vehicle such that it is able to record video sequences of the driver of the vehicle. Furthermore or as an alternative thereto, the at least one video camera may be installed in the vehicle such that it is able to record video sequences of the vehicle surroundings.

Furthermore or as an alternative thereto, the video camera, at least one sensor and/or the computer unit may be integrated into the vehicle via a mobile terminal. A mobile terminal is a device that is capable of communicating wirelessly in a mobile network via local area networks (LANs), such as for example Wireless Fidelity (WiFi), or via wide area networks (WANs) such as for example Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE) or World Wide Interoperability for Microwave Access (WIMAX). Communication using other present or future communication technologies is possible. The term mobile terminal in particular includes smartphones, but also other mobile telephones, personal digital assistants (PDAs), tablet PCs and all present and future electronic devices that are equipped with technology for loading and executing apps.

In this example, a mobile terminal may be placed in the vehicle such that the front and/or rear camera of the vehicle are/is able to record video sequences of the vehicle interior or driver and/or of the vehicle surroundings. By way of example, the mobile terminal may be installed in the vehicle such that the front camera of the mobile terminal is able to record video sequences of the driver of the vehicle, whereas the rear camera of the mobile terminal is able to record video sequences of the vehicle surroundings. The mobile terminal may be connected to the vehicle in a wired and/or wireless manner.

The computer unit may comprise the computer unit of the mobile terminal. The technical driving parameters may be captured at least by a sensor of the mobile terminal. Furthermore or as an alternative thereto, the technical driving parameters may be captured by at least one sensor of the vehicle. The sensor data may be transmitted from the vehicle to the mobile terminal in a wired and/or wireless manner.

Furthermore or as an alternative thereto, the computer unit may be located in the vehicle. In this example, the sensor data and/or the video sequences may be transmitted from the mobile terminal to the computer unit of the vehicle in a wired or wireless manner.

Furthermore or as an alternative thereto, a backend server may comprise the computer unit. In this case, the technical driving parameters and the video sequences may be transmitted from the vehicle and/or from the mobile terminal to the backend server. In this example, the vehicle may comprise a communication module. The communication module is capable of establishing a communication connection with other communication participants, for example other vehicles, the backend server, mobile terminals, etc., in order to transmit data. The communication module may be a participant identity module or a subscriber identity module or a SIM card (not shown) that serves to establish a communication connection via a mobile radio system. The participant identity module in this case uniquely identifies the communication module in the mobile radio network. The communication connection may be a data connection (for example packet transmission) and/or a wired communication connection (for example line transmission). A wireless communication connection with other communication participants via the communication module may also be established using other present and future technologies, for example local area networks (LANs) such as for example wireless LANs, etc.

The computer unit is configured so as to process each of the video sequences with regard to the captured technical driving parameters.

The computer unit is furthermore configured so as to mark each of the processed video sequences on the basis of predefinable criteria.

The computer unit is configured so as to automatically create a video comprising a predefinable number of appropriately marked video sequences.

It is thus advantageously possible to automatically create a video of a journey of a vehicle that contains video sequences with regard to technical driving parameters and according to appropriate marking.

The at least one sensor preferably comprises:
an acceleration sensor; and/or
a gyro sensor; and/or
one or more sensors of a driving dynamics control system.

An acceleration sensor or accelerometer is a sensor that determines an acceleration by measuring an inertia acting on a mass or test mass. By way of example, the acceleration sensor may determine the acceleration and a speed increase or decrease.

A gyro sensor is an acceleration sensor or orientation sensor that captures very small accelerations, rotational movements and/or a change in orientation of a mass or test mass. Data from the gyro sensor may be combined with position data from a position determination sensor. A position determination sensor is a sensor that is able to determine current position data with the aid of a navigation satellite system. The navigation satellite system may be any current or future global navigation satellite system (GNSS) for position determination and navigation by receiving signals from navigation satellites and/or pseudolites. By way of example, this may be the Global Positioning System (GPS), GLObal NAvigation Satellite System (GLONASS), Galileo positioning system and/or BeiDou Navigation Satellite System. In the case of GPS, the position determination sensor is a GPS sensor. By combining gyro sensor and position determination sensor, it is possible to determine changes in direction with very high accuracy.

A driving dynamics control system or electronic stability control (ESC) is an electronically controlled driver assistance system for vehicles that prevents skidding of the vehicle in the border area on a bend in the case of oversteering or understeering. For this purpose, the ESC may combine the anti-lock braking system (ABS) with an electronic braking force distribution, a braking assistant and a drive slip control system.

The ESC may comprise the following sensors:
steering angle sensor for capturing the applied steering angle; and/or
pressure sensors for capturing the braking pressure; and/or
ABS wheel sensors for capturing the wheel rotational speeds; and/or
rate of rotation sensor for capturing the rate of rotation; and/or
transverse acceleration sensor for capturing the transverse acceleration.

An electronic controller processes all of the signals from the abovementioned sensors and outputs corresponding drive signals to appropriate actuators.

The abovementioned sensors thus capture technical driving parameters. In other words, technical driving parameters comprise one or more of the items of data captured by the abovementioned sensors.

Processing each video sequence with regard to the recorded technical driving parameters preferably comprises expanding the metadata of the video sequence over the timeline with at least one technical driving parameter captured by the at least one sensor.

Each video sequence comprises a multiplicity of metadata. Automatically capturing and storing metadata regarding digital photo and video files is known. Metadata comprise for example a recording date of the respective image along a timeline of a video file. Metadata may furthermore comprise information about an orientation of the camera, a resolution, a GPS position, and the camera settings that are used, etc.

Processing each video sequence with regard to the captured technical driving parameters comprises expanding the metadata over the timeline with at least one technical driving parameter that was captured by the at least one sensor. The term "over the timeline" in particular means that the metadata are expanded with the respective technical driving parameters synchronously with respective images of a video sequence.

Technical driving parameters are thereby advantageously each correlated with automatically recorded video sequences.

Processing each video sequence with regard to the captured technical driving parameters preferably comprises rating the video sequence along the timeline, taking into account the at least one technical driving parameter.

Processing each video sequence comprises rating the video sequence along the timeline, taking into account the at least one technical driving parameter. The term "along the timeline" in particular means that a rating, which is also stored as an item of metadata, is given for each recorded image of each video sequence along the timeline thereof.

The respective video sequence may in this case be rated along the timeline using at least one rating scale.

By way of example, a rating scale may be predefined for each sensor. The rating scale may comprise appropriate scale values and comprise for example a scale division of 0-5; 0-10; 0-100; etc. The rating scale should be chosen appropriately for each sensor in order to display the technical driving parameters that are captured by the respective sensor in a manner able to be evaluated appropriately.

By way of example, a rating scale of 0-10 may be selected for the acceleration sensor, wherein 0 represents "no acceleration" and wherein 10 represents "maximum acceleration".

In the same way, an appropriate rating scale may be selected for any other sensor.

A dedicated rating may in this case be given automatically for each technical parameter in accordance with the associated rating scale.

Each video sequence is advantageously able to be evaluated automatically on the basis of the technical parameters by rating all of the video sequences along their timeline in accordance with the technical parameters.

Processing each video sequence with regard to the captured technical driving parameters preferably comprises creating a shortened video sequence of a predefinable length, wherein the shortened video sequence comprises the part of the video sequence with the highest rating along the timeline.

By virtue of rating all of the video sequences along their timeline in accordance with the technical parameters, each video sequence is able to be shortened automatically, wherein the shortened video sequence comprises the part of the video sequence with the highest rating or ratings along the timeline. The shortened video sequence may be created by way of an appropriate algorithm. The algorithm may use the ratings to select the part of the video sequence in which the technical driving parameters (in combination) were highest.

The highest-rated part of the video sequence in terms of driving, and thus the part of the video sequence most relevant to the driver of the vehicle, is thus advantageously selected as shortened video sequence.

Marking the processed video sequences preferably comprises:
an overall rating of the processed video sequence in accordance with predefinable criteria; and/or
assignment of a context to the processed video sequence.

Furthermore or as an alternative thereto, the processed video sequences may be marked. Marking the processed video sequences may comprise an overall rating thereof in accordance with predefinable criteria. By way of example, the ratings of all of the video sequences (or shortened video sequences) along the timeline may be given an overall rating using an appropriate algorithm.

It is thereby advantageously possible to automatically categorize each video sequence or shortened video sequence in line with its technical meaning with regard to the technical driving parameters (for example maximum acceleration, high load change, full braking, etc. or to appropriately categorize same).

Furthermore or as an alternative thereto, marking the video sequences may comprise automatically assigning a context to the video sequence or shortened video sequence.

By way of example, for predefined technical driving parameters, assigning a context to the respective video sequence may comprise:

| Technical driving parameter | Context |
|---|---|
| slight acceleration and/or no transverse acceleration and/or no braking pressure, etc. | 1 (unspectacular) |
| medium acceleration and/or slight transverse acceleration and/or medium braking pressure, etc. | 2 (interesting) |
| high acceleration and/or high applied steering angle and/or high braking pressure and/or high transverse acceleration | 3 (spectacular) |

By assigning the context, the processed video sequences for creating the video of the journey are advantageously able to be selected automatically.

According to a second aspect, the underlying object is achieved by way of a method for automatically creating a video of a journey, comprising:
continuously capturing technical driving parameters of a vehicle by way of at least one sensor;
continuously recording video sequences of a predefinable length by way of at least one video camera;
processing each of the recorded video sequences with regard to the captured technical driving parameters by way of a computer unit;
marking each of the processed video sequences on the basis of predefinable criteria by way of the computer unit; and
automatically creating a video comprising a predefinable number of appropriately marked video sequences by way of the computer unit.

The at least one sensor preferably comprises:
an acceleration sensor; and/or
a gyro sensor; and/or
one or more sensors of a driving dynamics control system.

Processing each video sequence with regard to the captured technical driving parameters preferably comprises expanding the metadata of the video sequence over the timeline with at least one technical driving parameter captured by the at least one sensor.

Processing each video sequence preferably comprises rating the video sequence along the timeline, taking into account the at least one technical driving parameter along the timeline of the video;
wherein processing each video sequence comprises creating a shortened video sequence of a predefinable length, wherein the shortened video sequence may comprise the part of the video sequence with the highest rating along the timeline.

Marking the processed video sequences preferably comprises:
an overall rating of the processed video sequence in accordance with predefinable criteria; and/or
assignment of a context to the processed video sequence.

These and other objects, features and advantages of the present invention will become clearer upon studying the following detailed description of preferred embodiments and the accompanying figures. It is apparent that, although embodiments are described separately, individual features thereof may be combined to form additional embodiments.

BRIEF DESCRIPTION OF THE DRAWINGS

FIG. 3 is an example of the automatic creation of a video of a journey.

DETAILED DESCRIPTION OF THE DRAWINGS

Figure 1:
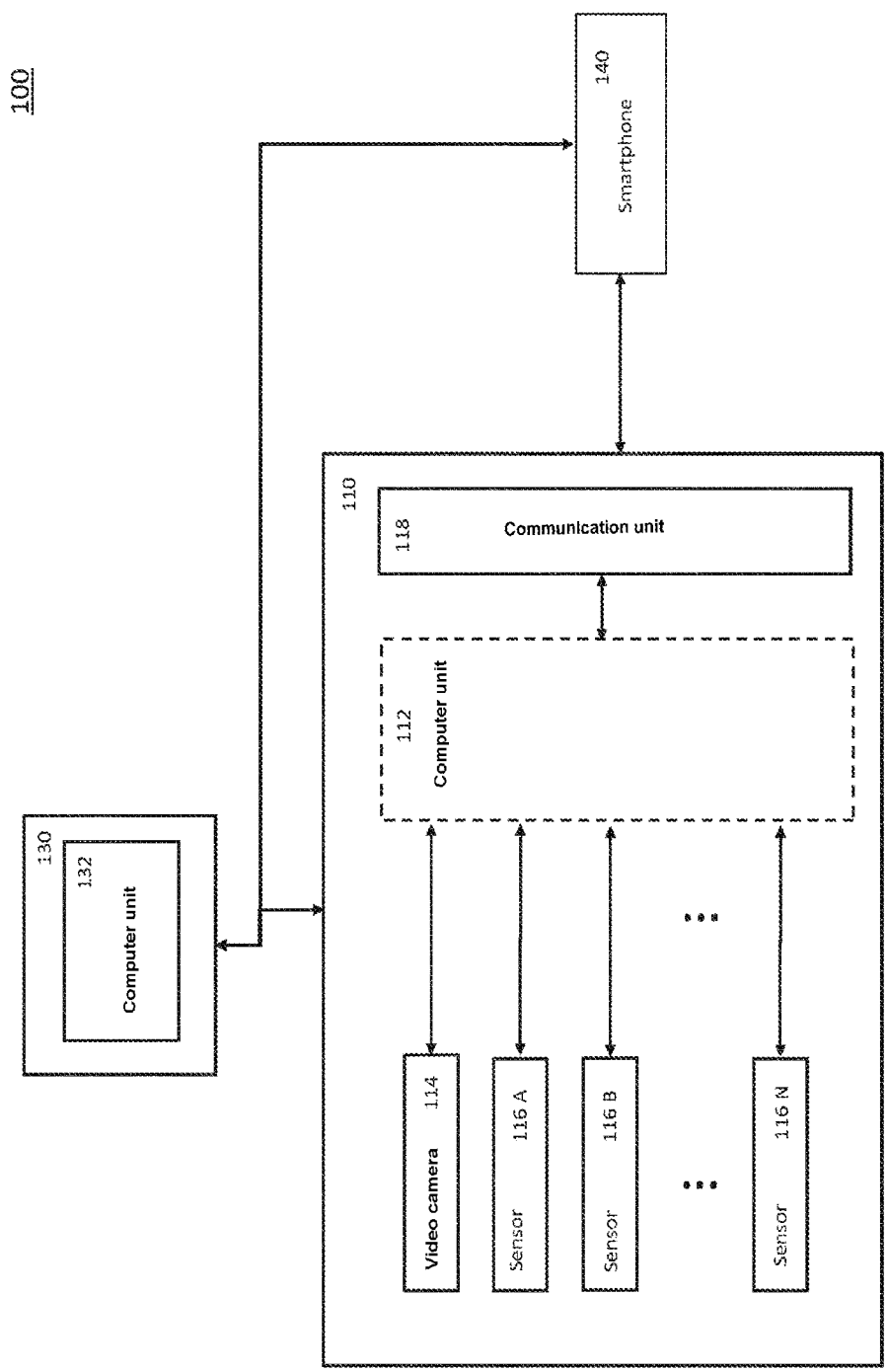
FIG. 1 is a schematic block diagram of system for automatically creating a video of a journey.

FIG. 1 schematically shows an example of a system 100 for automatically creating a video of a journey. The method as described with reference to FIG. 3 may be executed on the system 100.

The system 100 comprises at least one computer unit 112, 132 and at least one vehicle 110. The term vehicle 110 comprises automobiles, trucks, buses, RVs, motorcycles, etc. that are used to transport people, goods, etc. The term in particular comprises motor vehicles for passenger transport. The vehicle 110 may comprise at least one at least partly autonomous driving mode.

Each vehicle 110 has at least one sensor 116A ... 116N. The sensor 116A ... 116N is configured so as to continuously capture technical driving parameters of the vehicle 110. Continuously in this case for example comprises at regular time intervals and/or upon predefined events. Each vehicle 110 comprises at least one video camera 114 that is configured so as to continuously record video sequences of a predefinable length.

The at least one sensor 116A ... 116N may be an acceleration sensor or accelerometer. This determines an acceleration by measuring an inertia acting on a mass or test mass. By way of example, the acceleration sensor may determine the acceleration, a speed increase or decrease, etc.

Furthermore or as an alternative thereto, the at least one sensor 116A ... 116N may comprise a gyro sensor. A gyro sensor is an acceleration sensor or orientation sensor that captures very small accelerations, rotational movements and/or a change in orientation of a mass or test mass. Data from the gyro sensor may be combined with position data from a position determination sensor. A position determination sensor is a sensor that is able to determine current position data with the aid of a navigation satellite system. The navigation satellite system may be any current or future global navigation satellite system (GNSS) for position determination and navigation by receiving signals from navigation satellites and/or pseudolites. By way of example, this may be the Global Positioning System (GPS), GLObal NAvigation Satellite System (GLONASS), Galileo positioning system and/or BeiDou Navigation Satellite System. In the case of GPS, the position determination sensor is a GPS sensor. By combining gyro sensor and position determination sensor, it is possible to determine changes in direction with very high accuracy.

Furthermore or as an alternative thereto, the at least one sensor 116A . . . 116N may comprise one or more sensors of a driving dynamics control system. A driving dynamics control system or electronic stability control (ESC) is an electronically controlled driver assistance system for vehicles that prevents skidding of the vehicle in the border area on a bend in the case of oversteering or understeering. For this purpose, the ESC may combine the anti-lock braking system (ABS) with an electronic braking force distribution, a braking assistant and a drive slip control system.

The ESC may comprise the following sensors:
steering angle sensor for capturing the applied steering angle; and/or
pressure sensors for capturing the braking pressure; and/or
ABS wheel sensors for capturing the wheel rotational speeds; and/or
rate of rotation sensor for capturing the rate of rotation; and/or
transverse acceleration sensor for capturing the transverse acceleration.

An electronic controller captures the signals from the ESC sensors and outputs corresponding drive signals to appropriate actuators.

The abovementioned sensors thus capture technical driving parameters. In other words, technical driving parameters comprise one or more of the items of data or sensor data captured by the abovementioned sensors.

The video camera 114, the at least one sensor 116A . . . 116N and/or the computer unit 112 may be integrated in a fixed manner in the vehicle 110. The at least one video camera 114 may be installed in the vehicle 110 such that it is able to record video sequences of the driver of the vehicle 110. Furthermore or as an alternative thereto, the at least one video camera 114 may be installed in the vehicle 110 such that it is able to record video sequences of the vehicle surroundings.

Furthermore or as an alternative thereto, the video camera 114, at least one sensor 116A . . . 116N and/or the computer unit 112 may be integrated into the vehicle 110 via a mobile terminal 140. A mobile terminal 140 is a device that is capable of communicating wirelessly in a mobile network via local area networks (LANs), such as for example Wireless Fidelity (WiFi), or via wide area networks (WANs) such as for example Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE) or World Wide Interoperability for Microwave Access (WIMAX). Communication using other present or future communication technologies is possible. The term mobile terminal in particular includes smartphones, but also other mobile telephones, personal digital assistants (PDAs), tablet PCs and all present and future electronic devices that are equipped with technology for loading and executing apps.

In this example, a mobile terminal 140 may be installed in the vehicle 110 such that the front and/or rear camera of the mobile terminal 140 are/is able to record video sequences of the vehicle interior or driver and/or of the vehicle surroundings. By way of example, the mobile terminal 140 may be installed in the vehicle such that the front camera of the mobile terminal 140 is able to record video sequences of the driver of the vehicle 110, whereas the rear camera of the mobile terminal 140 is able to record video sequences of the vehicle surroundings. The mobile terminal 140 may be connected to the vehicle in a wired and/or wireless manner.

The computer unit 112 may comprise the computer unit of the mobile terminal 140. The technical driving parameters may be captured at least by a sensor 116A . . . 116N of the mobile terminal 140. Furthermore or as an alternative thereto, the technical driving parameters may be captured by at least one sensor 116A . . . 116N of the vehicle 110. The sensor data may be transmitted from the vehicle 110 to the mobile terminal 140 in a wired and/or wireless manner in order to be processed by the computer unit.

Furthermore or as an alternative thereto, the computer unit 112 may be integrated in the vehicle 110. In this example, the technical driving parameters of the sensors 116A . . . 116N (also called sensor data below) and/or the video sequences of the at least one video camera 114 may be transmitted from the mobile terminal 140 to the computer unit 112 of the vehicle 110 in a wired or wireless manner.

Furthermore or as an alternative thereto, a backend server 130 may comprise a computer unit 132. In this case, the technical driving parameters of the sensors 116A . . . 116N and the video sequences may be transmitted from the vehicle 110 and/or from the mobile terminal 140 to the backend server 130. In this example, the vehicle 110 may comprise a communication module.

The computer unit 112, 132 is configured so as to process each of the video sequences with regard to the captured technical driving parameters.

Processing each video sequence with regard to the captured technical driving parameters may comprise expanding the metadata of the video sequence over the timeline with at least one technical driving parameter captured by the at least one sensor 116A . . . 116N.

Each video sequence comprises a multiplicity of metadata. Automatically capturing and storing metadata regarding digital photo and video files is known. Metadata comprise for example a recording date of the respective image along a timeline of a video file. Metadata may furthermore comprise information about an orientation of the camera, a resolution, a GPS position, and the camera settings that are used, etc.

Processing each video sequence with regard to the captured technical driving parameters may comprise expanding the metadata over the timeline with at least one technical driving parameter that was captured by the at least one sensor 116A . . . 116N. The term "over the timeline" in particular means that the metadata are expanded with the respective technical driving parameters synchronously with respective images of a video sequence.

Technical driving parameters are thereby advantageously each correlated with automatically recorded video sequences.

Processing each video sequence with regard to the captured technical driving parameters may furthermore comprise rating the video sequence along the timeline, taking into account the at least one technical driving parameter.

Processing each video sequence may comprise rating the video sequence along the timeline, taking into account the at least one technical driving parameter. The term "along the timeline" in particular means that a rating, which may also be stored as an item of metadata, is automatically given for each recorded image of each video sequence along the timeline thereof.

The respective video sequence may in this case be rated along the timeline using predefined rating scales.

By way of example, a rating scale may be predefined for each sensor 116A . . . 116N. The rating scale may comprise appropriate scale values and comprise for example a scale division of 0-5; 0-10; 0-100; etc. The rating scale should be chosen appropriately for each sensor 116A . . . 116N in order to display the technical driving parameters that are captured by the respective sensor 116A . . . 116N appropriately.

By way of example, a rating scale of 0-10 may be defined for the acceleration sensor, wherein 0 represents "no acceleration" and wherein 10 represents "maximum acceleration".

In the same way, an appropriate rating scale may be defined for any other sensor 116A . . . 116N.

A dedicated rating may in this case be given automatically for each technical parameter in accordance with the associated rating scale.

The video sequences are advantageously able to be evaluated automatically on the basis of the technical parameters prevailing at the travel time by rating all of the video sequences along their timeline in accordance with the technical parameters.

Processing each video sequence with regard to the captured technical driving parameters may comprise creating a shortened video sequence of a predefinable length, wherein the shortened video sequence comprises the part of the video sequence with the highest rating along the timeline.

By virtue of rating, as explained above, all of the video sequences along their timeline in accordance with the technical parameters, each video sequence is able to be shortened or cropped automatically, wherein the shortened video sequence comprises the part of the video sequence with the highest rating or ratings along the timeline. The shortened video sequence may be created by way of an appropriate algorithm. The algorithm may use the ratings to select the part of the video sequence in which the technical driving parameter or parameters were rated highest or best.

Each video sequence is thus advantageously shortened automatically on the basis of the highest or best rating in terms of driving, and thus comprises the most relevant part of the video sequence for the driver of the vehicle 110. The length of the shortened video sequence may be predefined.

The computer unit 112, 132 is furthermore configured so as to mark each of the processed video sequences on the basis of predefinable criteria. Marking the processed video sequences may in this case comprise an overall rating of the processed video sequence on the basis of predefinable or predefined criteria. By way of example, the ratings of all of the processed video sequences along the timeline may be given an overall rating using an appropriate algorithm (for example, the higher the maximum acceleration in the processed video sequence, the higher the overall rating and/or the higher the braking force, the higher the overall rating, etc.). The criteria may be defined individually depending on the desired result.

It is thereby advantageously possible to automatically categorize each video sequence or shortened video sequence in line with its technical meaning with regard to the technical driving parameters (for example maximum acceleration, high load change, full braking, etc. or to appropriately categorize same).

Furthermore or as an alternative thereto, marking the video sequences may comprise automatically assigning a context to the video sequence or shortened video sequence.

By way of example, for predefined technical driving parameters, assigning a context to the respective video sequence may comprise:

| Technical driving parameter | Context |
|---|---|
| slight acceleration and/or no transverse acceleration and/or no braking pressure, etc. | 1 (unspectacular) |
| medium acceleration and/or slight transverse acceleration and/or medium braking pressure, etc. | 2 (interesting) |
| high acceleration and/or high applied steering angle and/or high braking pressure and/or high transverse acceleration | 3 (spectacular) |

By assigning the context, the processed video sequences for the following generation of an overall video of the vehicle are advantageously able to be selected automatically.

The computer unit 112, 132 is configured so as to automatically create a video comprising a predefinable number of appropriately marked video sequences.

It is thus advantageously possible to automatically create a video of a journey of a vehicle that contains video sequences with regard to technical driving parameters and according to appropriate marking. The automatic generation of a video of a journey is explained in more detail in an example with reference to FIG. 2.

Figure 2:
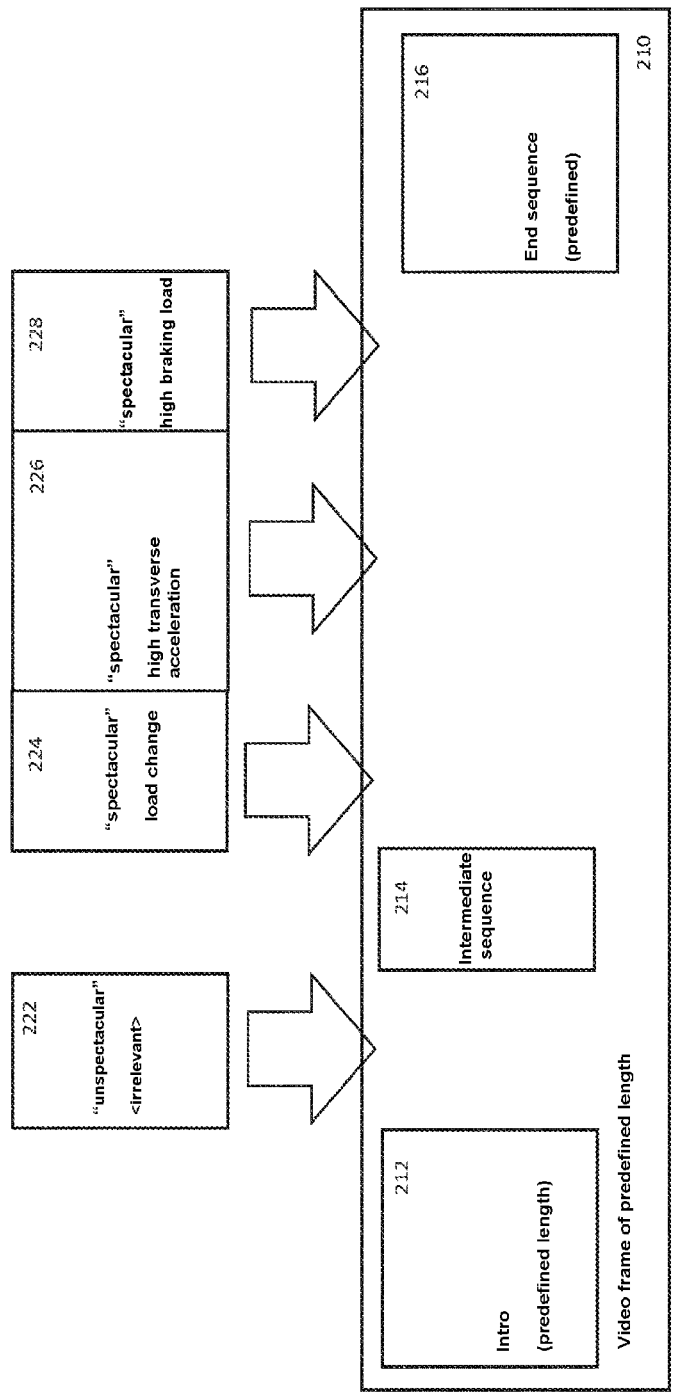
FIG. 2 schematically shows an example of an automatically created video of a journey, which video is composed of different video sequences.

FIG. 2 schematically shows an example of an automatically created video 200 of a journey. The video 200 is composed of different video sequences 211, 222, 214, 224, 226, 228, 216 that are inserted into a video frame 210. The video 200 may be created on the system 110 as described with reference to FIG. 1. The system 110 may for this purpose execute a method 300 as described with reference to FIG. 3.

A driver may initially be identified in the vehicle 110. This may be achieved in a manner known from the prior art, such as for example using biometric features (for example facial recognition), using knowledge (inputting of a user identification number with a corresponding password), using the identifier of the smartphone of the user, by reading a QR code that uniquely identifies the user, etc.

Following successful identification of the driver, after starting of the engine, the technical parameters may be captured by the sensors 116A . . . 116N and video sequences of a predefinable length may be generated—as described with reference to FIG. 1. By way of example, the cameras may be controlled such that video sequences of 1 minute (min), 2 min, 3 min or another appropriate length are generated. In a next step, the recorded video sequences may accordingly be processed by synchronously expanding the metadata of each video sequence—as described with reference to FIG. 1—with the technical driving parameters of the sensors 116A . . . 116N.

In a next step, the video sequences expanded with the technical driving parameters may be shortened or cropped to form video sequences of a predefined length, as described with reference to FIG. 1.

In a next step, the shortened video sequences may be marked as described with reference to FIG. 1.

In this example, a video frame 210 that comprises three predefined video sequences 212, 214, 216 is provided. The video sequence 212 is an introductory or intro sequence that is the same for all of the created videos and depicts for example a particular racetrack. The video sequence 214 is an intermediate sequence that depicts for example a particular hazardous area on the racetrack. The video sequence 216 is a predefined end sequence that may comprise for example credits and/or advertising content.

From the video sequences of a journey that are processed as described with reference to FIG. 1, in this example, four appropriate video sequences 222, 224, 226, 228 are selected for insertion into the video frame 210. The video sequences are selected automatically, taking into account their rating along the timeline and/or the markings.

In this example, video sequence 222 is marked as "1 (unspectacular)", since the technical driving parameters indicate slight acceleration and/or no transverse acceleration and/or low braking pressure, etc. This video sequence 222 shows the driver of the vehicle and may, in addition thereto, depict the driver of the vehicle as a "racing driver".

The video sequence 224 is marked as "spectacular" and as "load change". The video sequence 226 is marked as "spectacular" and as "high transverse acceleration". The video sequence 228 is marked as "spectacular" and as "high braking pressure".

Further elements, for example personalized data, may be incorporated into each video sequence. By way of example, the name of the identified driver may be incorporated into the sequence 222.

Before inserting video sequences 222, 224, 226, 228 into the video frame 210, the video sequences 224, 226, 228 may be evaluated again. Depending on predefined criteria (for example highest rating along the timeline), the video sequences may be shortened or cropped again. In this example, the video sequences 222, 224 and 228 are shortened again, in the same way as described with reference to FIG. 1, whereas video sequence 226 is inserted without further editing.

A personalized overall video 200 of a journey is advantageously thereby created automatically, which overall video contains a depiction of the driver of the vehicle and a summary of the most spectacular driving sections of the journey.

The video 200 is created by the computer unit 112, 132 in the vehicle or mobile terminal or at the backend server 130.

The video 200 may be provided for downloading and/or for video streaming by the backend server 130 (possibly after being transmitted to the backend server 130 beforehand) to the user in a manner known from the prior art. Furthermore or as an alternative thereto, the video 200 may be transmitted automatically to the mobile terminal 140 of the identified driver.

The video sequences 222, 224, 226, 228 are the appropriately marked video sequences that are integrated automatically into the video 200.

FIG. 3 shows a flowchart that illustrates an example of a method 300 for automatically creating a video 210 of a journey. The method 300 may be executed on a system 100 as described with reference to FIG. 1. The method steps of the method may be performed as described with reference to FIG. 1.

The method 300 comprises continuously capturing 310 technical driving parameters of a vehicle 110 by way of at least one sensor 116A . . . 116N;

continuously recording 320 video sequences of a predefinable length by way of at least one video camera 116;

processing 330 each of the recorded video sequences with regard to the captured technical driving parameters by way of a computer unit 112, 132;

marking 340 each of the processed video sequences on the basis of predefinable criteria by way of the computer unit 112, 132; and automatically creating 350 a video comprising a predefinable number of appropriately marked video sequences by way of the computer unit 112, 132.

The at least one sensor 116A . . . 116N may comprise:
an acceleration sensor; and/or
a gyro sensor; and/or
one or more sensors of a driving dynamics control system.

Processing each video sequence with regard to the captured technical driving parameters may comprise expanding the metadata of the video sequence over the timeline with at least one technical driving parameter captured by the at least one sensor.

Processing each video sequence may comprise rating the video sequence along the timeline, taking into account the at least one technical driving parameter of the video.

Processing each video sequence may comprise creating a shortened video sequence of a predefinable length, wherein the shortened video sequence comprises the part of the video sequence with the highest rating along the timeline.

Marking the processed video sequences may comprise:
an overall rating of the processed video sequence in accordance with predefinable criteria; and/or
assignment of a context to the processed video sequence.

What is claimed is:

1. A system for automatically creating a video of a journey, comprising:
   at least one computer unit;
   a vehicle comprising:
   a first sensor configured to continuously capture a first technical driving parameter of the vehicle, wherein
      a first rating scale is predefined for the first sensor to rate the first technical driving parameter;
   a second sensor configured to continuously capture a second technical driving parameter of the vehicle, wherein
      a second, different rating scale is predefined for the second sensor to rate the second technical driving parameter;
   at least one video camera configured to continuously record video sequences of a predefinable length;
   wherein the computer unit is configured to:
   process each of the video sequences with regard to the captured technical driving parameters to select a portion of the video sequence based on the rated first and/or second technical driving parameter,
   mark each of the processed video sequences on the basis of predefinable criteria, and
   automatically create a video comprising a predefinable number of the marked and processed video sequences.

2. The system according to claim 1, wherein the first and/or second sensor are selected from:
   a transverse acceleration sensor;
   a pressure sensor;
   an ABS wheel sensor;
   a gyro sensor; or
   one or more sensors of a driving dynamics control system.

3. The system according to claim 1, wherein
processing each video sequence with regard to the captured first and/or second technical driving parameters comprises expanding metadata of the video sequence over a timeline with the first and/or second technical driving parameter captured by the first and/or second sensor.

4. The system according to claim 3, wherein
processing each video sequence comprises rating the video sequence along the timeline, taking into account the first and/or second technical driving parameter.

5. The system according to claim 4, wherein
processing each video sequence comprises creating a shortened video sequence of a predefinable length, wherein the shortened video sequence comprises the part of the video sequence with a highest rating, based on the first and/or second rating scales, along the timeline.

6. The system according to claim 4, wherein marking the processed video sequences comprises:
an overall rating of the processed video sequence based on the rated first and/or second technical driving parameters in accordance with predefinable criteria; and
assignment of a context to the processed video sequence.

7. The system according to claim 1, wherein processing each video sequence comprises:
creating a shortened video sequence including parts of the video sequence with the first and/or second technical driving parameters that are rated at a high rating, based on the respective first and/or second rating scale, and excluding parts of the video sequence with the technical driving parameters that are rated lower than the high rating, based on the respective first and/or second rating scale.

8. The system according to claim 7, wherein marking the processed video sequences comprises:
providing an overall rating for a plurality of shortened video sequences based on the rated first and/or second technical driving parameters of the plurality of shortened video sequences in accordance with of the first and/or second rating scale.

9. The system according to claim 7, wherein marking the processed video sequences comprises:
assigning a context to the processed video sequence from a plurality of contexts, the contexts categorizing the processed video sequence based on the rated first and/or second technical driving parameters within the processed video sequence relative to the rated first and/or second technical driving parameters of at least one other processed video sequence.

10. The system according to claim 1, wherein
the first/and or second technical driving parameters are captured while the vehicle is operated on a racetrack.

11. The system according to claim 1, wherein the computer unit is further configured to:
insert an additional video sequence showing a driver of the vehicle into the video during a time in which the captured first and/or second technical driving parameters exhibit a lowest rating according to the respective first and/or second rating scale.

12. The system according to claim 1, wherein
the at least one video camera further comprises a front and rear camera of a mobile terminal to record a video sequence of a driver of the vehicle and a video sequence of surroundings of the vehicle.

13. The system according to claim 1, wherein
the at least one sensor of the vehicle and/or of a mobile terminal are further configured to continuously capture technical driving parameters of the vehicle during at least one partially autonomous driving mode.

14. A method for automatically creating a video of a journey, comprising:
continuously capturing first and second technical driving parameters of a vehicle by way of a first sensor and second sensor, respectively, wherein
a first rating scale is predefined for the first sensor to rate the first technical driving parameter;
a second, different rating scale is predefined for the second sensor to rate the second technical driving parameter;
continuously recording video sequences of a predefinable length by way of at least one video camera;
processing each of the recorded video sequences with regard to the captured technical driving parameters to select a portion of the video sequence based on the rated first and/or second technical driving parameter by way of a computer unit;
marking each of the processed video sequences on the basis of predefinable criteria by way of the computer unit; and
automatically creating a video comprising a predefinable number of the marked and processed video sequences by way of the computer unit.

15. The method according to claim 14, wherein the first and/or second sensor are selected from:
a transverse acceleration sensor;
a pressure sensor;
an ABS wheel sensor;
a gyro sensor; or
one or more sensors of a driving dynamics control system.

16. The method according to claim 14, wherein
processing each video sequence with regard to the first and/or second captured technical driving parameters comprises expanding metadata of the video sequence over a timeline with the first and/or second technical driving parameter captured by the first and/or second sensor.

17. The method according to claim 16, wherein processing each video sequence comprises:
rating the video sequence along the timeline, taking into account the first and/or second technical driving parameter;
creating a shortened video sequence of a predefinable length, wherein the shortened video sequence may comprise the part of the video sequence with a highest rating, based on the first and/or second rating scales, along the timeline.

18. The method according to claim 17, wherein marking the processed video sequences comprises:
an overall rating of the processed video sequence based on the rated first and second technical driving parameters in accordance with predefinable criteria; and
assignment of a context to the processed video sequence.

19. The method of claim 17, further comprising:
further shortening the shortened video sequence after processing at least one additional video sequence.

* * * * *